(12) United States Patent
Pardi

(10) Patent No.: US 12,040,708 B2
(45) Date of Patent: Jul. 16, 2024

(54) MULTI-LEVEL POWER CONVERTER WITH HYSTERETIC CONTROL

(71) Applicant: Apple Inc., Cupertino, CA (US)

(72) Inventor: Enrico Pardi, Cascina (IT)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 17/485,003

(22) Filed: Sep. 24, 2021

(65) Prior Publication Data

US 2023/0102278 A1    Mar. 30, 2023

(51) Int. Cl.
*H02M 3/158* (2006.01)
*H02M 3/157* (2006.01)

(52) U.S. Cl.
CPC .......... *H02M 3/158* (2013.01); *H02M 3/157* (2013.01); *H02M 3/1588* (2013.01)

(58) Field of Classification Search
CPC .... H02M 3/158; H02M 3/157; H02M 3/1588; H02M 1/0003
See application file for complete search history.

(56) References Cited

U.S. PATENT DOCUMENTS

| | | | |
|---|---|---|---|
| 9,660,533 B2 | 5/2017 | Choudhary | |
| 10,116,207 B1 | 10/2018 | Malinin | |
| 10,734,898 B1 * | 8/2020 | Arnold | H02M 3/158 |
| 11,005,365 B2 | 5/2021 | Romeo | |
| 11,258,359 B2 * | 2/2022 | Baek | H02M 3/07 |
| 2016/0261189 A1 * | 9/2016 | Lidsky | H02M 3/156 |
| 2016/0329809 A1 * | 11/2016 | Granato | H02M 3/158 |
| 2019/0058385 A1 * | 2/2019 | Lazaro | H02M 3/158 |
| 2019/0058397 A1 * | 2/2019 | Lazaro | H02M 7/4837 |
| 2022/0302827 A1 * | 9/2022 | Tarroboiro | H02M 3/158 |

* cited by examiner

*Primary Examiner* — Kyle J Moody
(74) *Attorney, Agent, or Firm* — Kowert, Hood, Munyon, Rankin & Goetzel, P.C.; Dean M. Munyon

(57) ABSTRACT

A multi-level power converter with hysteretic control is disclosed. In one embodiment, a power converter includes a switching circuit and a control circuit. The switching circuit includes a plurality of switches, a capacitor, and a switch node coupled to a regulated supply voltage node via an inductor. The switching circuit is configured to couple the switch node to different circuit nodes according to different switch states. The control circuit is configured to activate a particular set of switches according a current switch state, perform a comparison of an output current of the switching circuit to various threshold values, and determine a next switch state using results of the comparison and duty cycle information. Based on these results, the control circuit is configured to cause a transition from the current switch state to the next switch state by activating a different set of switches according to the next switch state.

20 Claims, 9 Drawing Sheets

MULTI-LEVEL POWER CONVERTER WITH HYSTERETIC CONTROL

BACKGROUND

Technical Field

This disclosure is directed to electronic circuits, and more particularly, to switching power converters.

Description of the Related Art

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include two switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is on, energy is applied to the inductor, allowing the current through the inductor to increase. Such a time period may be referred to as an "on-time period" or a "charge period." During one of these time periods, the inductor stores energy in the form of a magnetic field. When the high-side switch is opened and the low-side switch is closed, energy is no longer being applied to the inductor, and the voltage across the inductor reverses. During these periods, which may be referred to as "off-time periods", the inductor functions as a current source, with the energy stored in the inductor's magnetic field supporting the current flowing into the load. The process of closing and opening the high-side and low-side switches is performed periodically to maintain a desired voltage level on the power supply node.

The power switches included in buck converters may be operated in different modes. In some cases, a buck converter may employ pulse width modulation (PWM), in which the frequency with which the buck converter cycles is fixed, but the period of time that the high-side switch is closed is adjusted based on a comparison of an output voltage of the buck converter to a reference voltage. In other cases, a buck converter may employ pulse frequency modulation (PFM), in which the frequency with which the buck converter cycles (including on-time, off-time, and idle time) is adjusted based on the load current.

Some buck converters may employ multiple inductors driven by respective phase circuits (also referred to as "phase units"). The phase circuits are operated out of phase with each other to better manage power delivered to a load. In order to reduce the area needed for multiple inductors, coupled inductors may be used. As used and described herein, "coupled inductors" refer to two or more inductors that share a common magnetic core. The use of a common magnetic core allows some degree of mutual inductance between the pair of inductors.

SUMMARY

A multi-level power converter with hysteretic control is disclosed. In one embodiment, a power converter includes a switching circuit and a control circuit. The switching circuit includes a plurality of switches, a capacitor, and a switch node coupled to a regulated supply voltage node via an inductor, wherein the switching circuit is configured to couple the switch node to different circuit nodes and element according to different ones of a plurality of switch states. The control circuit is configured to activate a particular set of the plurality of switches according a current switch state of the plurality of switch states, perform a comparison of an output current of the switching circuit to a plurality of threshold values and determine a next switch state of the plurality of switch states using results of the comparison and duty cycle information. Based on these results, the control circuit is configured to cause a transition from the current switch state to the next switch state by activating a different set of the plurality of switches according to the next switch state.

In one embodiment, the control circuit includes a state machine. The state machine may cause the switching circuit to switch between different ones of the plurality of states. Determining a next state may include determining a relationship of the output current to one or more current thresholds, the relationship of the voltage on the capacitor to at least one threshold, or both.

BRIEF DESCRIPTION OF THE DRAWINGS

The following detailed description makes reference to the accompanying drawings, which are now briefly described.

DETAILED DESCRIPTION OF EMBODIMENTS

Hysteretic power converters use current mode control to keep an inductor current between upper and lower limits (sometimes referred to as "peak" and "valley," respectively). These types of power converters offer high bandwidth relative to other types of switching converters, as the peak/valley control doubles the sampling rate and thus increases its Nyquist limit. Hysteretic converters are often times used in low voltage applications.

Traditional hysteretic power converters use a bang-bang control methodology to operate switches (e.g., high side and low side switches of a two-level buck converter), with the frequency of switching being dependent on the peak and valley thresholds and the changing inductor current. Using these two thresholds, the hysteretic power converter may switch between two different states.

The present disclosure extends hysteretic control from a two-level converter to multi-level power converters having three or more levels. In one embodiment, a multi-level power converter with hysteretic control includes a switching circuit having a first plurality of switches coupled between a switch node and an input voltage node, and a second plurality of switches coupled between the switch node and a ground (or reference) node. A capacitor, sometimes referred to as a fly capacitor, may have a first terminal coupled to ones of the first plurality of switches and ones of the second plurality of switches. An inductor is coupled between the switching node and a regulated supply voltage node. A control circuit includes comparator circuitry and a state machine. The comparator circuitry compares the output current to various thresholds, e.g., four different thresholds for a three-level hysteretic buck converter. The comparator circuitry also compares the voltage across the capacitor to a threshold voltage. Depending on the results of the comparisons and whether the multi-level power converter is operating with a duty cycle of greater than 50% or less than 50%, the state machine determines a next switching state. A switching state may be changed when a current threshold is reached and/or a voltage threshold is crossed.

Various embodiments of a multi-level power converter having at least three levels are now discussed in further detail. The description begins with a basic embodiment of a multi-level power converter, followed by a more detailed schematic diagram. Thereafter, example state diagrams illustrating possible modes of operation of a multi-level power converter according to the disclosure are discussed. Graphic illustrations of possible operation by various embodiments of a multi-level power converter are then described. The discussion continues with a description of a method for operation, and closes with a description of an example system.

Figure 1:
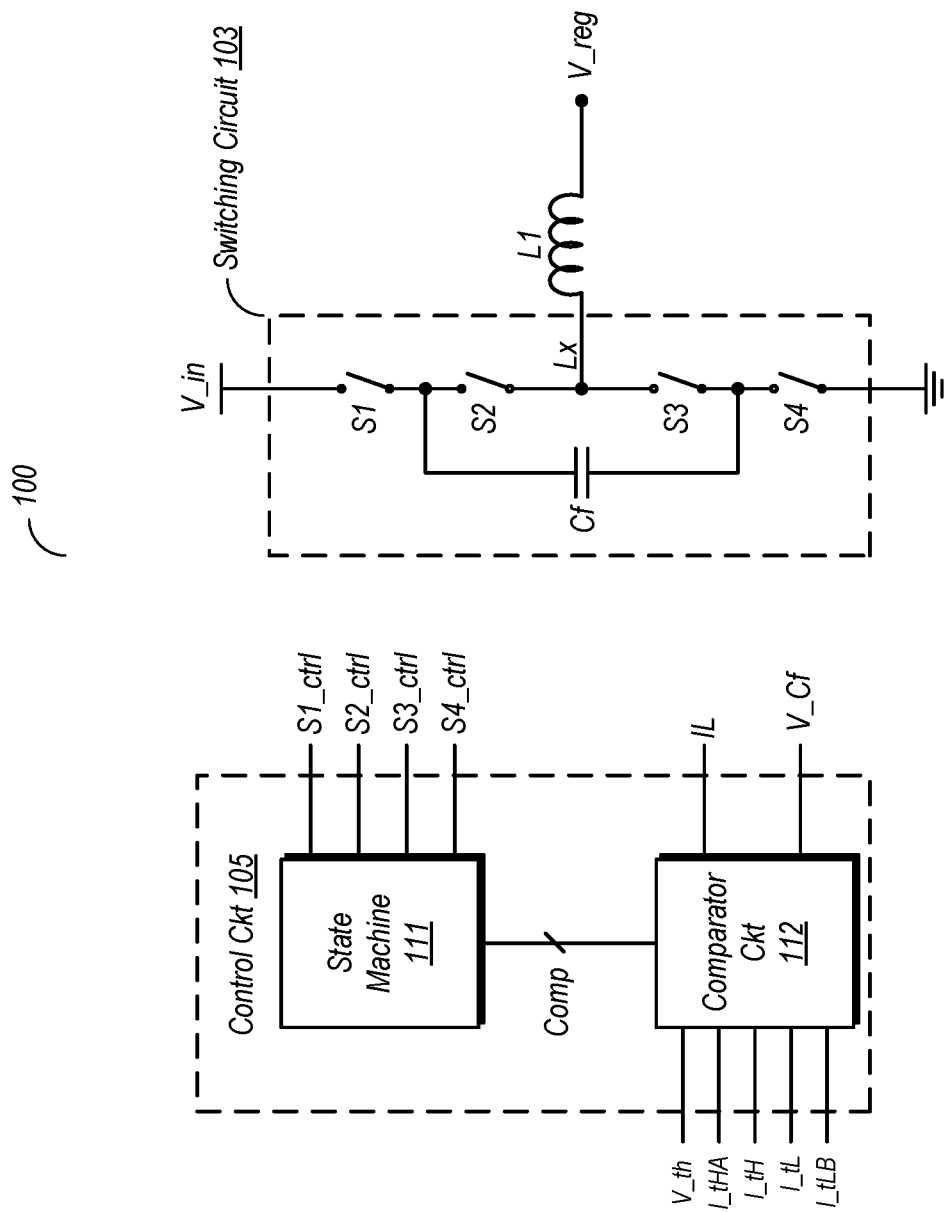
FIG. 1 is a diagram of one embodiment of a multi-level power converter utilizing hysteretic control.

Multi-Level Power Converter with Hysteretic Control:

FIG. 1 is a diagram of one embodiment of a multi-level power converter utilizing hysteretic control. In the embodiment shown, power converter 100 includes a switching circuit 103 and a control circuit 105. Switching circuit 103 in the embodiment shown includes a pair of high-side switches S1 and S2, and a pair of low side switches S3 and S4. High side switches S1 and S2 are coupled in series between switch node Lx and an input voltage node V_in, while low side switches S3 and S4 are coupled in series between switch node Lx and a ground node. A capacitor (sometimes referred to as a fly capacitor) Cf is coupled between the junction of S1 and S2, and the junction of S3 and S4. Switch node Lx is further coupled to an inductor L1 at one terminal, while the other terminal of L1 is coupled to a regulated supply voltage node V_reg.

Control circuit 105 in the embodiment shown includes a state machine 111 and comparator circuitry 112. State machine 111 is configured to generate control signals (S1_ctrl to S1, S2_ctrl to S2, etc.) that are used to activate and deactivate the various ones of the switches of switching circuit 103. Moreover, state machine 111 may generate switching signals according to a number of different switching states. For a particular switching state, state machine 111 may cause the activation of particular set of the switches of switching circuit 103. When state machine 111 transitions to a next switch state, a different set of the switch signals may be activated, thereby causing different ones of switches S1-S4 to be closed. State machine 111 may make a determination of a next switch state based on comparison information received from comparator circuit 112.

State machine 111 may be implemented using any suitable circuitry, including various types of combinational logic circuits, sequential logic circuits (e.g., storage circuits such as flip-flops), and so on. Embodiments of a state machine implemented using programmable logic (e.g., a field programmable gate array) are also possible and contemplated, as is processing circuitry that executes software/firmware instructions.

In the embodiment shown, comparator circuit 112 is configured to receive a number of different threshold signals. In this particular embodiment, comparator circuit 112 is configured to receive a voltage threshold signal (V_th), as well as four different current thresholds, I_thA, I_th, I_tL, and I_tLB. Comparator circuit 112 is also coupled to receive an inductor current I_L and a voltage V_cf corresponding to a voltage across capacitor Cf. It is noted that the current may be taken from another part of switching circuit 103, but is generally a current that corresponds to an output current. In some embodiments, these thresholds may be generated by threshold generation circuitry that utilizes the output voltage of the power converter, or a voltage derived therefrom. One example of threshold generation circuitry is discussed in further detail below with reference to FIG. 2. The thresholds may vary during operation in some embodiments. Furthermore, these thresholds may be chose based on desired system performance Using the various current and voltage thresholds, comparator circuitry 112 may perform a number of comparisons. Power converter 100 in the embodiment shown may operate using hysteretic control, which is a form of current mode control. Furthermore, as power converter 100 in this particular embodiment is a three-level converter, it utilizes the additional thresholds for making control decisions (in contrast to hysteretic control in a two-level converter, which utilizes two thresholds). The voltage of capacitor Cf is also considered in making control decisions. This is also in contrast to using hysteretic control in a two-level converter, as two-level converters do not typically utilize a fly capacitor.

Based on the results of the comparisons performed in comparator circuitry 112, a number of comparison result signals ("Comp") are generated. These signals are received by state machine 111 and used in determining a next switching state to which to transition from a current switching state.

Figure 2:
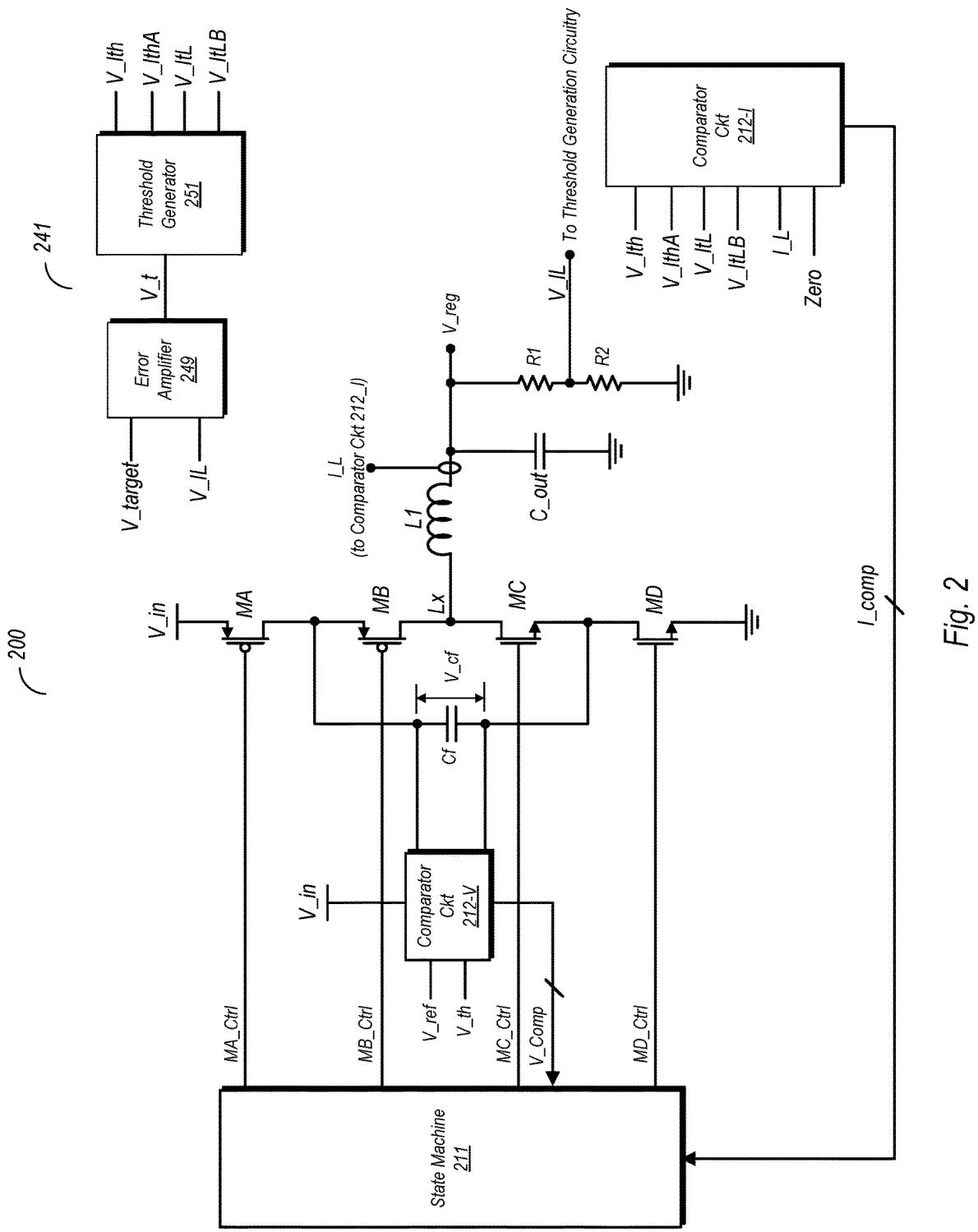
FIG. 2 is a schematic diagram of one embodiment of a multi-level power converter utilizing hysteretic control.

FIG. 2 is a schematic diagram of one embodiment of a multi-level power converter utilizing hysteretic control. Power converter 200 in the embodiment shown is a three-level buck converter implemented with hysteretic control. The disclosure more generally contemplates N-level power converters (where N>=3) utilizing hysteretic control, and thus neither FIG. 1 nor FIG. 2 is intended to be limiting.

In the embodiment shown a switching circuit is implemented using PMOS devices MA and MB (for high side switches) and NMOS device MC and MD (for low side switches). A capacitor Cf is coupled between the junction of MA and MB, and the junction of MC and MD. The junction of MB and MC is coupled to switching node Lx, which in turn is coupled to inductor L1. The other terminal of inductor L1 is coupled to a regulated supply voltage node V_reg. An output capacitor C_out is coupled between the regulated supply voltage node and a ground node.

Comparison circuitry in the illustrated embodiment includes comparator circuit 212-I and comparator circuit 212-V. Comparator circuit 212_I is coupled to receive a voltage V_IL, which is provided from a resistive voltage divider that includes resistors R1 and R2. Comparator circuit 212-V also includes a number of voltage inputs corresponding to current thresholds. These voltages include V_IthA, V_Ith, V_ItL, and V_ItLB, which are listed in their order of their respective value from largest to smallest, and thus correspond to the actual current thresholds to which they correspond. Alternatively, these values can be provided as currents for directly comparing currents in some embodiments. A current I_L, corresponding to the measured output current, is also input into comparator circuit 212-I. A corresponding voltage may be generated within comparator circuit 212-I based on I_L in some embodiments. The current I_L may be sensed at the point shown in the drawing, or at other points within the switching circuitry that includes devices MA-MD. A zero current input is also received for comparisons to zero crossings. These voltages that correspond to current thresholds may be generated using various types of circuits, such as bandgap circuits, current mirrors with voltage conversion circuits, and so on. One embodiment of possible threshold generation circuitry is shown in FIG. 2, as threshold generation circuit 241. In the embodiment shown, the threshold generation circuitry 241 includes an error amplifier 249 coupled to receive a voltage, V_target (representative of a desired output voltage) and V_IL (representative of the current output voltage). The error amplifier 249 may generate an initial threshold value V_t, which is then provided to threshold generator 251. Threshold generator 251 may generate the thresholds based on the value V_t received from error amplifier 249. For example, an embodiment is possible and contemplated in which V_ItlB=V_t, V_Itl=V_Itlb+ΔV1, V_ItH=V_Itl+ΔV2, and V_ItH=V_ItH+ΔV3. In some embodiments, the values ΔV1, ΔV2, and ΔV3 may be programmable values that are determined based on factors such as desired operating frequencies (or to avoid undesired operating frequencies), system poles and zeros, and so on.

Internally, comparator circuit 212 may include a number of comparators (e.g., analog comparators), each of which may receive the value IL (or a voltage corresponding thereto) on one input and a corresponding one of the threshold values on the other input. More generally, a comparator circuit according to the disclosure may directly compare currents or may compare voltages corresponding to currents. The output signals generated by each of these comparators may be aggregated into a multi-bit signal I_comp, each bit of which indicates a comparison result with regard to a corresponding one of the thresholds.

The comparison circuitry of the illustrated embodiment also includes comparator 212-V, which is coupled to receive two threshold inputs, V_th and V_ref. Comparator circuit 212-V is also coupled to receive the input voltage, V_in, as well as the voltage V_cf, which is a measured voltage across capacitor Cf. In some embodiments, comparator circuit 212-V may include measurement circuitry for measuring this voltage. For example, comparator circuit 212-V may include an operational amplifier configured to generate an output voltage that is proportional to the voltage V_cf. Comparator 212-V may also include analog comparators or other comparison circuitry therein used to perform comparison of V_th and V_ref to the input voltage or values based thereon. In one embodiment, the reference voltage V_ref may be compared to a value of V_in/2, with the comparison being used as a basis for certain state transitions. It is noted however that embodiments that do not include this input (V_ref) or perform this comparison are possible and contemplated. Another comparator implemented within comparator circuit 212-V may be configured to compare V_cf to V_th, and use this comparison result as a basis for some state transitions. The comparison signals generated in comparator circuit 212-V may, when multiple comparisons are performed therein, be aggregated into a multi-bit signal V_Comp. If the only comparison performed therein is the threshold voltage to the capacitor voltage V_cf, then only a single bit is provided.

The comparison signals of I_comp and V_comp are provided as inputs to state machine 211. State machine 211 may utilize various ones of these comparison results to determine a next switch state to which to transition from a current switch state. A switch state is defined herein by which devices are active at a given time. For example, a switch state "AB" in the embodiment shown corresponds to the activation of devices MA and MB, while devices MC and MD are inactive. Similarly, a switch state "BD" corresponds to activation of devices MB and MD, while devices MA and MC are inactive.

In addition to the results of the comparisons received from comparators circuits 212-I and 212-V, state machine 211 may also consider a specified duty cycle of the power converter 200. The duty cycle of a switching circuit is defined herein as the ratio of on time (e.g., magnetizing the inductor L1) to the time of the entire cycle. Thus, for a duty cycle that is greater than 50%, inductor L1 is more than 50% of the cycle time in the embodiment shown. For a duty cycle of less than 50%, inductor L1 is magnetized for less than 50% of the full cycle time.

Typically, multi-level converters having three or more levels, such as power converter 200, operate with a duty cycle of other than 50%. For example, two possible sequences of switching states for operating with a duty cycle of greater than 50% are:
AB→AC→AB→BD or
AB→BD→AB→AC.

Two possible sequences of switching states of operating with a duty cycle of less than 50% are:
CD→AC→CD→BD or
CD→BD→CD→AC.

It is noted that other possible switching state sequences are possible and contemplated for duty cycles greater than and lesser than 50%.

Control of the switching states may be carried out by state machine by asserting and de-asserting the various control signals to the devices of the switching circuit in the illustrated embodiment. For the illustrated example, assertion of the signals MA_Ctrl, MB_Ctrl, MC_Ctrl, and MD_Ctrl result in on the respective gate terminals of MA, MB, MC, and MD cause activation of these devices. Similarly, de-assertion of these control signals result in the de-activation of these devices. It is noted that in this particular embodiment, MA_Ctrl and MB_Ctrl are active low (due to their driving respective gate terminals of PMOS devices) while MC_Ctrl and MD_Ctrl are active high (due to their driving respective gate terminals of NMOS devices). However, this is not intended to limit the disclosure. For example, in embodiments in which the high-side devices are implemented using NMOS devices instead of PMOS devices (and include corresponding bootstrap circuitry), their respective control signals may also be active high.

The present disclosure contemplates various embodiments of a state machine, with corresponding possibilities of switching state sequences. Various possible sequences carried out by state machine 211 are illustrated in the state diagrams of FIGS. 3-5, which are now discussed in further detail.

Figure 3:
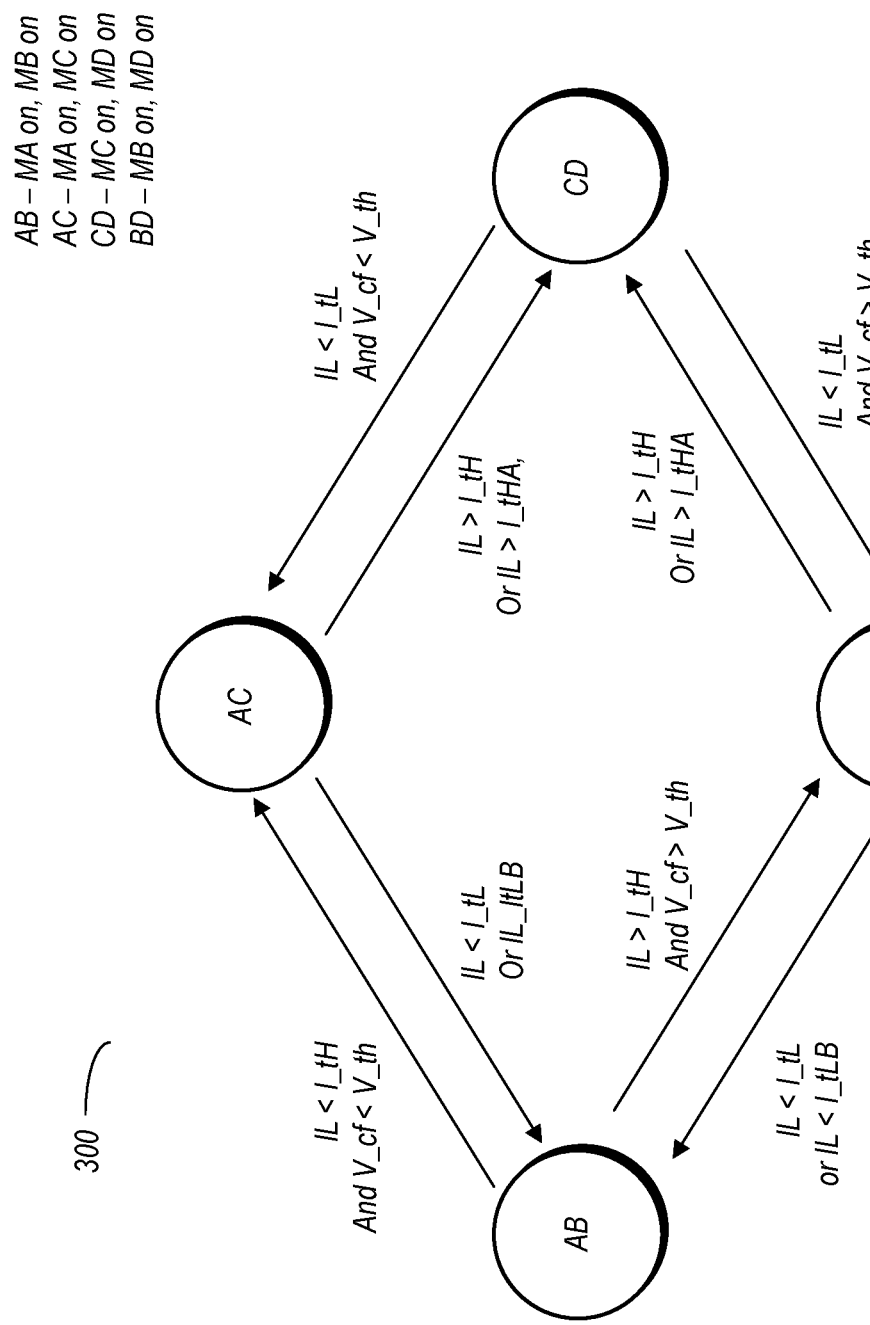
FIG. 3 is a state diagram illustrating different states of operation for one embodiment of a multi-level power converter utilizing hysteretic control.

State Diagrams:

FIG. 3 is a state diagram illustrating different states of operation for one embodiment of a multi-level power converter utilizing hysteretic control. State diagram 300 in the embodiment shown corresponds to one possible set of switching states and transitions that may be carried out by an embodiment of a state machine in accordance with this disclosure, based on the various comparisons that may be carried out by the comparator circuits discussed above.

With regard to the thresholds listed in the following state diagrams, it is noted that the current thresholds, from highest in value to lowest, are as follows: I_thA, I_th, I_tL, and I_tLB.

Beginning with state AB, a transition may be made to state AC when the inductor current IL>I_tH and capacitor voltage V_cf<V_th. On the other hand, if IL>I_tH but V_cf>V_th, a transition is made from state AB to state BD. When operating in state AC, capacitor Cf may be charging, while capacitor Cf is discharging in state BD. Generally speaking, capacitor Cf may charge in certain switching states, while discharging in other switching states.

From state AC, a transition to state CD may follow if IL>I_tH or IL>I_thA. More generally, this state transition occurs when the inductor current is at, near, or above its upper bound. Thus, when a transition is made to CD, both low-side devices are activated to pull the switching node low and thus reduce the current through the inductor as it demagnetizes. A transition from state AC back to state AB may be made in this embodiment if IL<I_tL or IL<I_tLB. In this condition the current is below both of the upper thresholds. Accordingly, switching back to AB allows the inductor current to rise, as both high side devices are active in state AB.

In state CD, both low-side switches are active, thereby allowing the inductor L1 to demagnetize. From state CD, a transition may be made to state BD if the inductor current IL<I_tL and the capacitor voltage V_cf>V_th. Thus, the state transition from CD to BD occurs when the inductor current is below the second lowest current threshold while the capacitor voltage is greater than the specified threshold. Alternatively, a transition may be made from state CD to state AC under the same current condition but the opposite voltage condition. Thus, in deciding whether to transition from state CD to state AC or state BD the capacitor voltage is considered in the embodiment shown. If the capacitor voltage is less than the voltage V_th, the next transition may be to state AC to allow the capacitor voltage to increase. If the capacitor voltage is greater than V_th, the next transition may be to state BD to allow the capacitor voltage to decrease.

From state BD, a transition may be made to state CD when either of the conditions IL>I_tH or IL>I_thA is true. Thus, the BD to CD transition occurs when the inductor current is at or near its upper limits. On the other hand, if either of the conditions IL<I_tL or IL<I_tLB is true (when inductor current is at or near its lower limits), a state transition is made back to state AB.

As noted above, the sequence of switching states through which transitions are made may be different for operation with duty cycles above 50% and duty cycles below 50%. Returning to the examples provided above, operation at duty cycles above 50% may include either of the following sequences as applied to state diagram 300:

AB→AC→AB→BD or
AB→BD→AB→AC.

Similarly, operation with a duty cycle of less than 50% may include either of the following sequences as applied to state diagram 300:

CD→AC→CD→BD or
CD→BD→CD→AC.

It is noted that embodiments are possible and contemplated in which operation may switch between duty cycles of less than 50% to duty cycles that are greater than 50%. Accordingly, various embodiments of the state machine discussed above may be arranged to switch a switch sequence between ones that cause operation at greater than a 50% duty cycle and ones that cause operation at less than 50% duty cycle.

Figure 4:
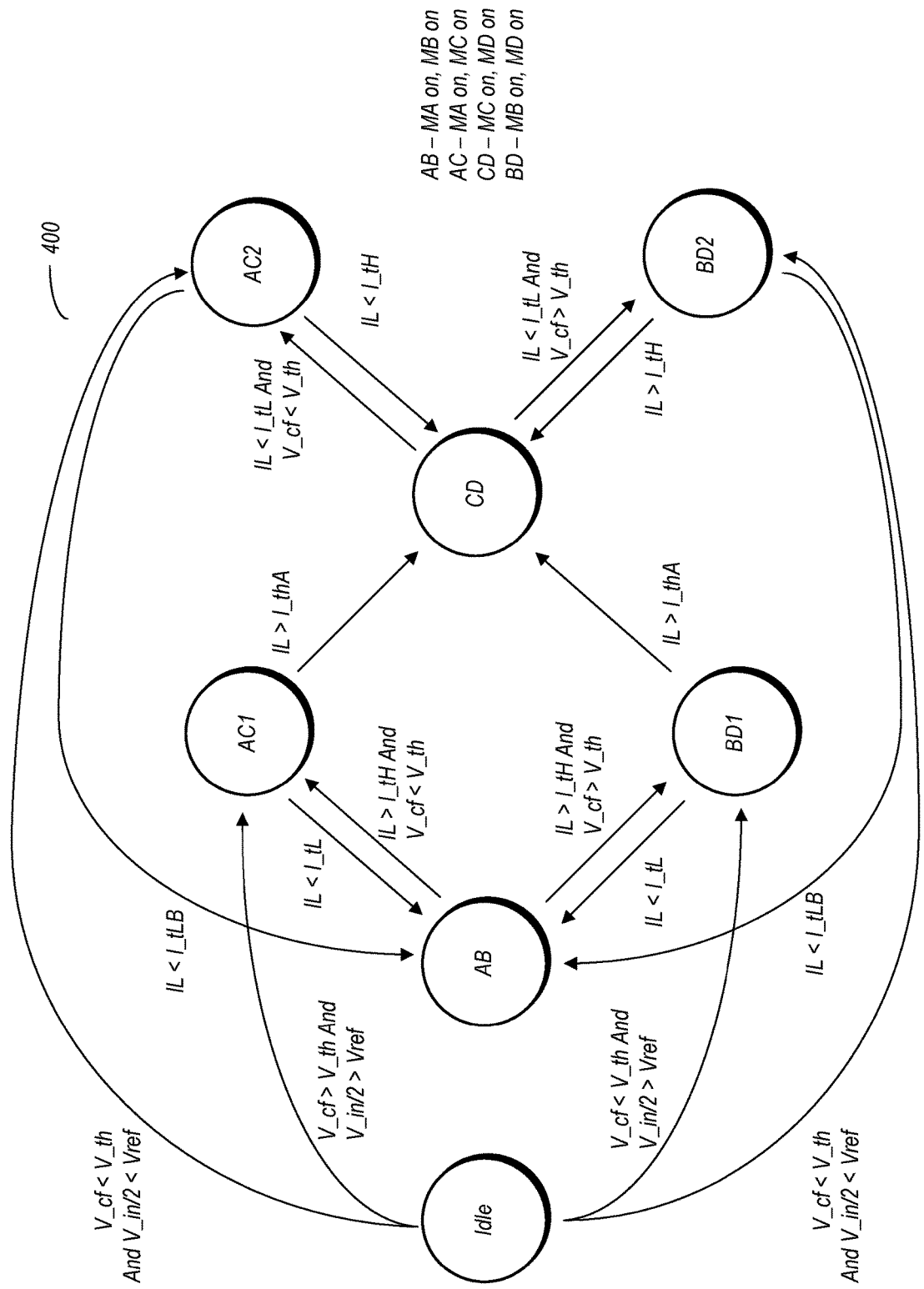
FIG. 4 is a state diagram illustrating different states of operation for one embodiment of a multi-level power converter utilizing hysteretic control.

FIG. 4 is a state diagram illustrating different states of operation for one embodiment of a multi-level power converter utilizing hysteretic control. State diagram 400 in the embodiment shown includes the states listed for state diagram 300, and further includes some of the same transitions. Certain state transitions in state diagram 400, as discussed below, also consider the relationship of V_in/2 to V_ref as a condition for transition. It is noted that utilizing the relationship of V_in/2 to V_ref as a basis for the comparisons shown in FIG. 4 is but one possible, non-limiting example. For example, a relationship between the value V_in-V_ref as compared to V_reg may also be considered in other embodiments.

It is noted that for states AC and BD, two separate states are listed for each in the diagram—AC1 and AC2, BD1 and BD2. While the switching states are functionally the same for these states (e.g., AC1 and AC2 both involve activation of the same devices), the conditions for entry and exit are different. Accordingly, for the sake of illustration, these states are presented as separate states even though they are functionally the same with respect to the switches that are activated.

State diagram 400 also includes an idle state from which operations may begin. The initial state from which operation may begin from the idle state may be AC2 or BD2, depending on the value of the capacitor voltage and the input voltage, V_in. More particularly, if V_in/2<V_ref and V_cf<V_th (e.g., upon system startup), state diagram transitions from the idle state to one of states AC2 or BD2. Some subsequent transitions may depend on whether operation is to occur in with a duty cycle of greater than 50% or less than 50%. For example, the next transition from AC2 or BD2 may be to state AB when operating with a duty cycle of greater than 50%, while the next state transition may be to state CD if operating with a duty cycle of less than 50%.

From state AB (both high-side devices active), a condition of IL>I_tH while the capacitor voltage V_cf<V_th results in a transition to AC1. However, if the capacitor voltage V_cf>V_th while the inductor current IL>I_tH, the switching state transitions from AB to BD1. From AC1, the state transitions back to AB if the inductor current IL<I_tL. However, if the inductor current IL>I_thA, the switching state transitions from AC1 to CD (both low side switches active). Similarly, from BD1, if the inductor current IL<I_tL, the switching state transitions back to AB, but transitions to CD if the inductor current IL>I_thA. It is noted that the voltages used in the comparisons (V_cf and V_th) may be different than those discussed here (e.g., V_in-V_ref and V_reg, per the example discussed above).

From switching state CD, state diagram 400 may transition to either AC2 or BD2. In both cases, the transition may occur when the inductor current IL<I_tL, and thus the particular transition is dependent on the relationship of the capacitor voltage V_cf to V_th (e.g., to AC when V_cf<V_th, to BD when V_cf>V_th). From either AC2 or BD2, a switching state transition back to state CD may occur when the inductor current IL<I_tH (which may coincide with operation at a duty cycle of less than 50%). A transition from AC2 or BD2 to switching state AB may occur when inductor current IL<I_tLB (which may coincide with operation at a duty cycle that is greater than 50%).

From switching state AB, state diagram 400 transitions to either AC1 or BD1 when the inductor current IL>I_tH and the capacitor voltage V_cf>V_th. From AC1 or BD1, the next state transition may be back to state AB when inductor current IL<I_tL. If inductor current IL>I_thA, the next state transition from AC1 or BD1 is to switching state CD.

Figure 5:
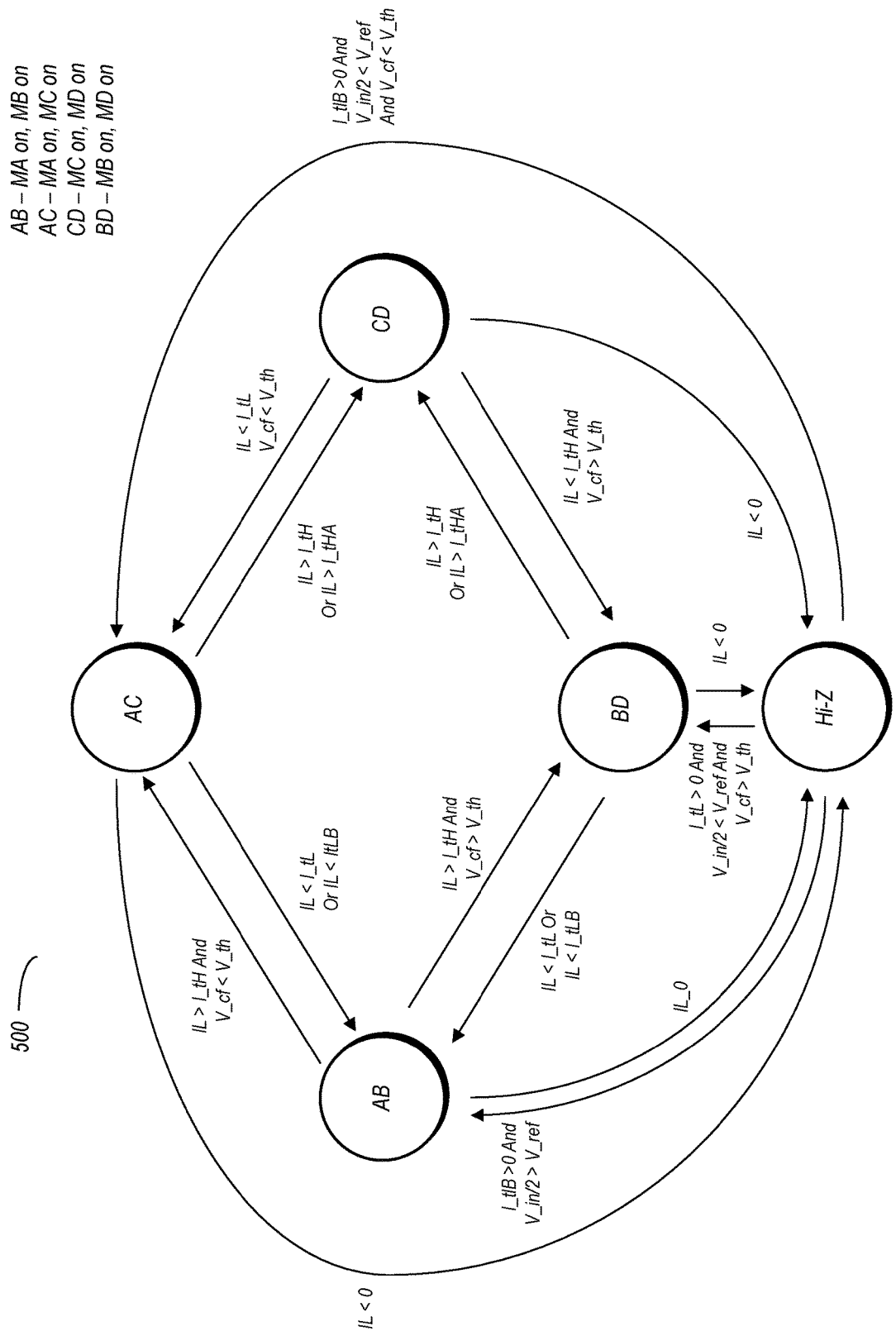
FIG. 5 is a state diagram illustrating different states of operation for one embodiment of a power converter utilizing hysteretic control.

FIG. 5 is a state diagram illustrating different states of operation for one embodiment of a power converter utilizing hysteretic control. In the illustrated embodiment, state diagram 500 includes a high impedance state (Hi-Z) in which all devices in the switching circuit are turned off. With respect to the state transitions between AB, AC, BD, and CD, the conditions for transitioning from one switching state to another may be the same as those discussed above with reference to FIG. 3. However, additional state transitions are possible with the addition of state Hi-Z. It is noted that to implement a state machine capable of operating in accordance with state diagram 500, at least one additional comparator may be added. This comparator may detect when at least one of I_tL or I_tLB crosses zero, and it is noted that these threshold values are not fixed values in such an embodiment.

From the Hi-Z state, a transition may be made to switching states AB, AC, or BD depending on the particular conditions. Furthermore, any of the other states may transition into the Hi-Z state given certain conditions. States BD, CD, and AC may all transition to the Hi-Z state when the inductor current IL<0. A transition from state AB to the Hi-Z state may occur when the capacitor voltage V_cf>V_th.

A transition from the Hi-Z state to state AB may occur when the inductor current I_tLB>0 and V_in/2>V_ref. If an additional condition is met (the capacitor voltage V_cf<V_th), the Hi-Z state may transition to switching state AC. A transition from the Hi-Z state to switching state BD may occur when I_tLB>0, V_in/2>V_ref and V_cf>V_th.

As with the embodiments discussed above, some state transitions in state diagram 500 may occur when operating with a duty cycle greater than 50%, while certain other state transitions occur when operating with a duty cycle that is less than 50%.

Figure 6:
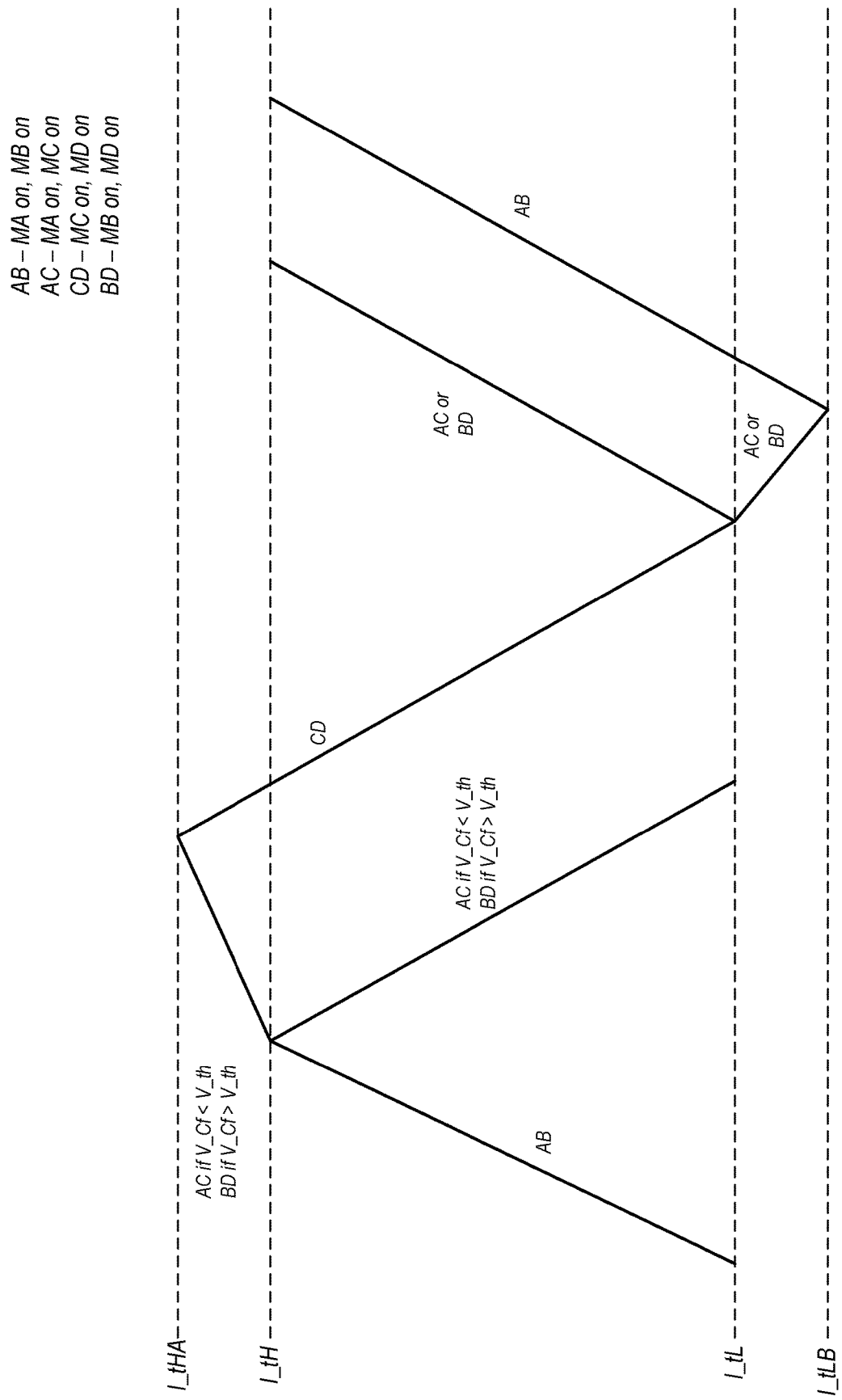
FIG. 6 is a graph illustrating the operation of one embodiment of a multi-level power converter utilizing hysteretic control.

Graphic Illustration of Certain Switching Transitions:

FIG. 6 is a graph illustrating the operation of one embodiment of a multi-level power converter utilizing hysteretic control. More particularly, FIG. 6 illustrates the operation with respect to inductor current and the various current thresholds in particular switching states and transitions there between.

Stating at the current threshold I_tL and in state AB (both high-side switches active), inductor current rises to the threshold value at I_th. Thereafter, a transition is made to one of switching states AC or BD, depending on the comparison between V_cf and V_th. Thereafter, if current continues rising to threshold I_thA, the next state transition is to switching state CD (both low side switches active). After current has fallen to the threshold I_tL, the next state transition is to one of AC or BD. If current continues to fall to I_tLB, the next state transition is back to AB. If the current falls when transitioning from state AB to AC or BD, at It_H, the next state transition may be one of those in accordance with one of the state diagrams discussed above. For example, at I_tL, the state may switch back to state AB.

Figure 7:
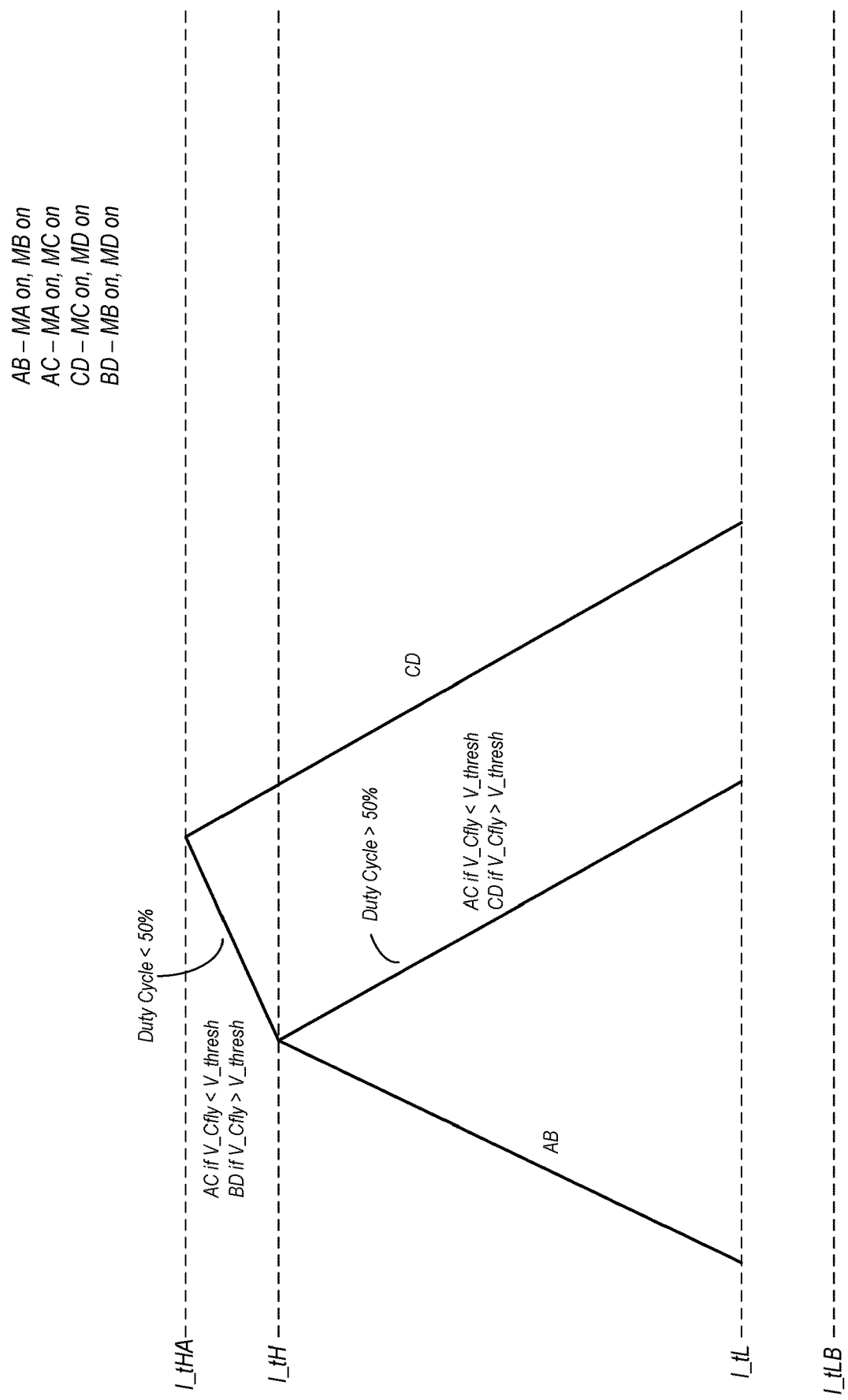
FIG. 7 is another graph further illustrating the operation of one embodiment of a multi-level power converter utilizing hysteretic control.

FIG. 7 is another graph further illustrating the operation of one embodiment of a multi-level power converter utilizing hysteretic control. In FIG. 7, operation again begins at threshold I_tL and in switching state AB. As inductor current reaches the threshold I_tH, the next transition, when operating at a duty cycle of greater than 50%, is to AC or BD, depending on V_cf and its relation to V_th. Current may continue rising until reaching the threshold I_thA, after which the next switching state is state CD.

If operating with a duty cycle of less than 50%, the transition at I_tH is to one of AC or CD, depending on the relationship between V_cf and V_th. Thereafter, current may fall until reaching I_tL. The next transition may be made in accordance with the duty cycle and the specific conditions at the time I_tL is reached. For example, a transition to switching state BD may occur, as in FIG. 3, if V_cf<V_th when I_tL is reached.

It is noted that the operation illustrated by FIGS. 3-7 is provided by way of example, but the figures are not intended to be limiting. For the three-level buck converter whose operation is depicted in these figures, the state transitions may vary from those explicitly discussed herein for operation above a 50% duty cycle as well as for operation below a 50% duty cycle. Furthermore, operation may shift to above and below 50% duty cycle at various times, such as in response to changing load current demands. Furthermore, for the three-level example embodiments discussed herein, the changes in switching states are performed responsive to the listed thresholds and conditions derived therefrom, as well as certain voltages. As noted above, these thresholds may vary during operation (although fixed threshold embodiments are possible and contemplated as well). More generally, the disclosure is directed to performing hysteretic control of a power converter having three or more levels, with a corresponding number of thresholds, while the switching state evolutions may vary widely from one embodiment to the next while falling within the scope of this disclosure.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The present disclosure further contemplates the use of memristors where applicable.

Figure 8:
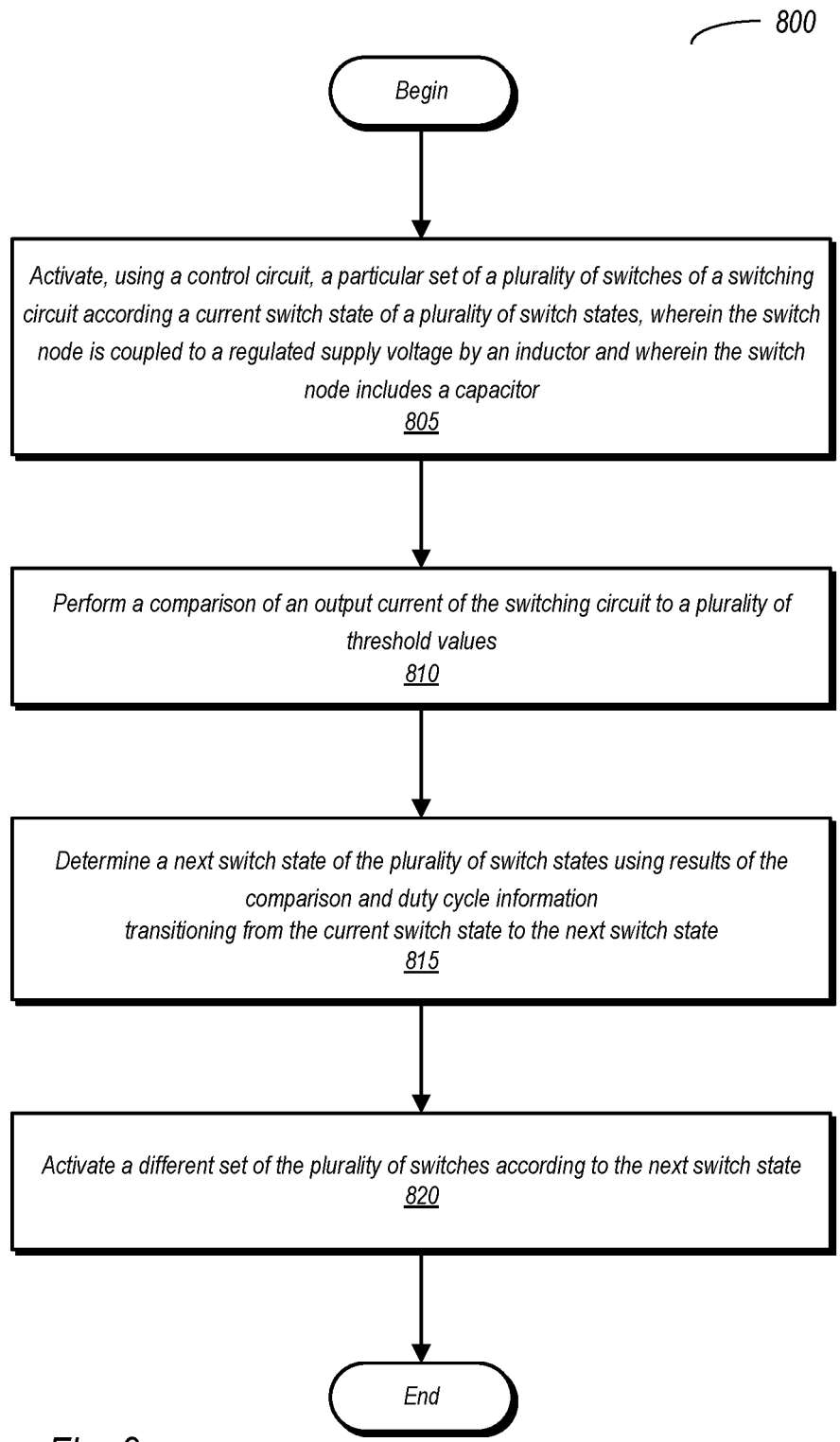
FIG. 8 is a flow diagram of one embodiment of a method for operating a multi-level power converter utilizing hysteretic control.

Method Flow Diagram:

FIG. 8 is a flow diagram illustrating one embodiment of a method for operating a multi-level power converter utilizing hysteretic control. Method 800 may be performed using various embodiments of the multi-level power converter as discussed above. Embodiments of a multi-level power converter capable of carrying out Method 800, but not explicitly discussed herein, also fall within the scope of this disclosure.

Method 800 includes activating, using a control circuit, a particular set of a plurality of switches of a switching circuit according a current switch state of a plurality of switch states, wherein the switch node is coupled to a regulated supply voltage by an inductor and wherein the switch node includes a capacitor (block 805). The method further includes performing a comparison of an output current of the switching circuit to a plurality of threshold values (block 810). Using results of the comparison and duty cycle information, the method further includes determining a next switch state of the plurality of switch states (block 815) and transitioning from the current switch state to the next switch state (block 820). Transitioning to the next switch state comprises activating a different set of the plurality of switches (block 825).

In various embodiments, the method further includes a state machine of the control circuit causing operation of the plurality of switches in various ones of a plurality of switch states based on comparisons of the output current to first, second, third and fourth current thresholds. The method may also include comparing a voltage across the capacitor to a threshold voltage and causing operation of the plurality of switches to switch to particular ones of the plurality of switch states based on comparing the voltage across the capacitor to the threshold voltage.

Some embodiments of the method include operating the first and second pluralities of switches, using the control circuit, in a first sequence of the plurality of switch states for a duty cycle greater than 50%. Such embodiments may also include operating the first and second pluralities of switches, using the control circuit, in a second sequence of the plurality of switch states for a duty cycle less than 50%.

As noted above, embodiments of a multi-level power converter include a capacitor (sometimes referred to as a fly capacitor). Accordingly, embodiments of the method may include charging the capacitor during operation in a first subset of the plurality of switch states and discharging the capacitor during operation in a second subset of the plurality of switch states.

Figure 9:
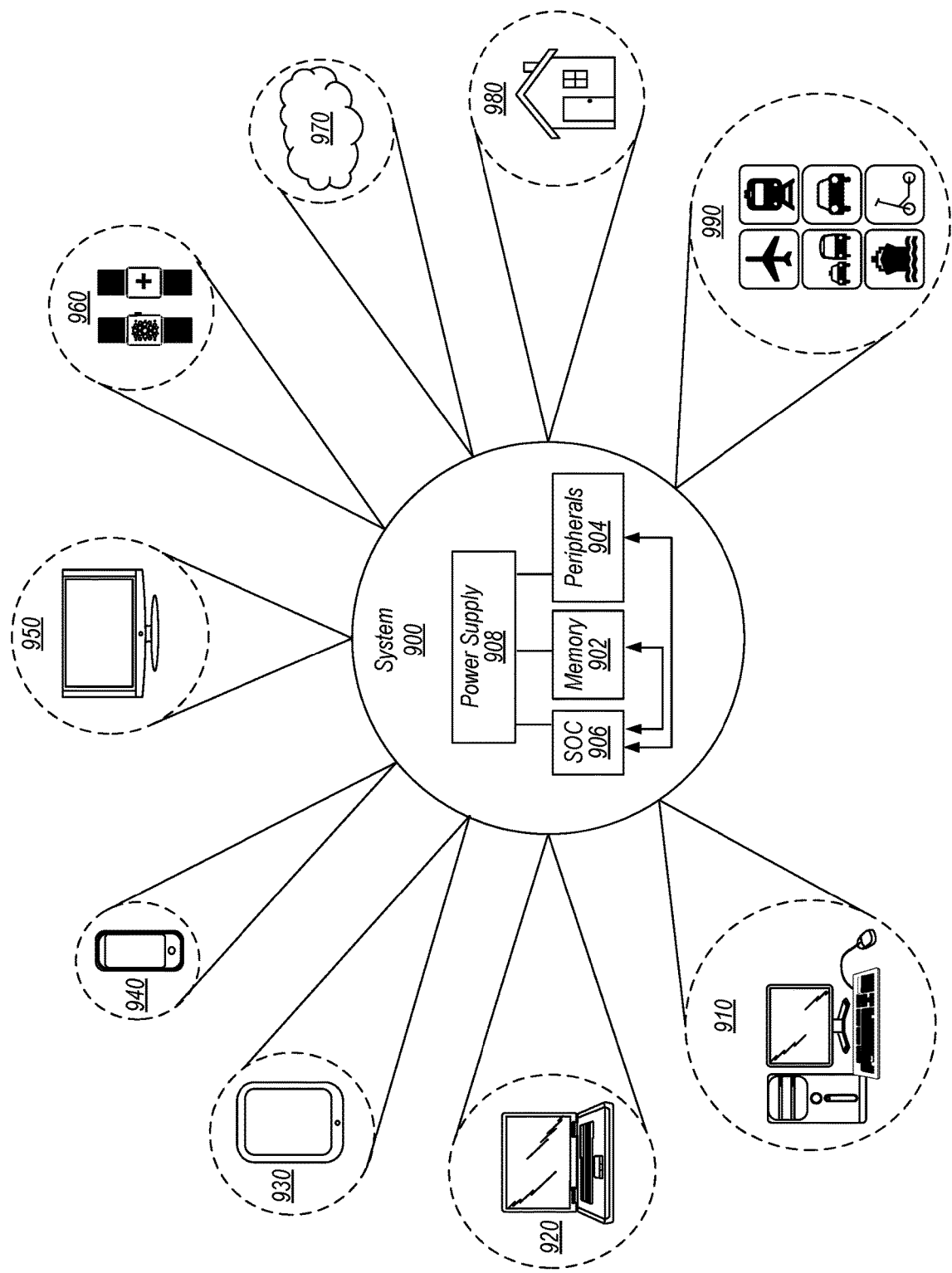
FIG. 9 is a block diagram of one embodiment of an example system.

Example System:

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

System 900 may include one or more instances of a power converter as disclosed herein. More particularly, system 900 may include one or more instances, in various embodiments, of a multi-level (e.g., >3) power converter utilizing hysteretic control.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch 960 may include a variety of general-purpose computing related functions. For example, smartwatch 960 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a switching circuit including a plurality of switches, a capacitor, and a switch node coupled to a regulated supply voltage node via an inductor, wherein the switching circuit is configured to couple the switch node to different circuit nodes and elements according to different ones of a plurality of switch states; and
   a control circuit configured to:
      activate a particular set of the plurality of switches according to a current switch state of the plurality of switch states;
      perform a comparison of an output current of the switching circuit to a plurality of threshold values;
      determine a next switch state of the plurality of switch states using results of the comparison and duty cycle information;
      transition from the current switch state to the next switch state; and
      activate a different set of the plurality of switches according to the next switch state;
      wherein the control circuit includes a state machine configured to operate the plurality of switches in various ones of the plurality of switch states based on comparisons of the output current to first, second, third and fourth current thresholds.

2. The apparatus of claim 1, wherein the control circuit further includes a plurality of comparators configured to compare the output current to ones of a plurality of current thresholds, and wherein the state machine is configured to switch between ones of the plurality of switch states based on comparisons performed by ones of the plurality of comparators.

3. The apparatus of claim 2, wherein the control circuit further includes a fifth comparator configured to compare a voltage across the capacitor to a threshold voltage.

4. The apparatus of claim 3, wherein the state machine is configured to, when operating in the first one of the plurality of switch states:
   cause a transition to a second one of the plurality of switch states in response to determining that the voltage across the capacitor is less than the threshold voltage and the output current exceeds a particular one of the plurality of threshold values; and
   cause a transition to a third one of the plurality of switch states in response to determining that the voltage across the capacitor is greater than the threshold voltage and the output current exceeds a first one of the plurality of threshold values.

5. The apparatus of claim 4, wherein the state machine is configured to, when operating in the second one of the plurality of switch states, cause a transition to the first one of the plurality of switch states in response to determining that the output current is less than a second one of the plurality of threshold values, irrespective of the voltage across the capacitor.

6. The apparatus of claim 2, wherein the state machine is configured to operate the plurality of switches to cause charging of the capacitor during a first subset of the plurality of switch states, and further configured to operate the plurality of switches to cause discharging of the plurality of switches during a second subset of the plurality of switch states.

7. The apparatus of claim 1, wherein the control circuit is configured to operate the plurality of switches through a first subset of the plurality of switch states for a duty cycle greater than 50%, and further configured to operate the plurality of switches through a second subset of the plurality of switch states for a duty cycle less than 50%.

8. The apparatus of claim 1, wherein the plurality of switches includes:
   first and second switches coupled in series between the switch node and an input voltage node; and
   third and fourth switches coupled in series between the switch node and a ground node.

9. The apparatus of claim 8, wherein the capacitor includes a first terminal coupled to a junction of the first and second switches, and a second terminal coupled to a junction of the third and fourth switches.

10. The apparatus of claim 1, further comprising a threshold generation circuit configured to generate the first, second, third and fourth current thresholds based on an initial threshold generated by comparing a target voltage to a current output voltage.

11. A method comprising:
activating, using a control circuit, a particular set of a plurality of switches of a switching circuit according a current switch state of a plurality of switch states, wherein ones of the plurality of switches are coupled to a switch node, and wherein the switch node is coupled to a regulated supply voltage by an inductor and wherein the switch node includes a capacitor;
performing a comparison of an output current of the switching circuit to a plurality of threshold values;
determining a next switch state of the plurality of switch states using results of the comparison and duty cycle information;
transitioning from the current switch state to the next switch state; and
activating a different set of the plurality of switches according to the next switch state;
wherein the method further comprises a state machine of the control circuit causing operation of the plurality of switches in various ones of a plurality of switch states based on comparisons of the output current to first, second, third and fourth current thresholds.

12. The method of claim 11, further comprising:
comparing a voltage across the capacitor to a threshold voltage; and
causing operation of the plurality of switches to switch to particular ones of the plurality of switch states based on comparing the voltage across the capacitor to the threshold voltage.

13. The method of claim 11, further comprising:
operating the plurality of switches through a first subset of the plurality of switch states, using the control circuit, in a first sequence of the plurality of switch states for a duty cycle greater than 50%; and
operating the plurality of switches through a second subset of the plurality of switch states, using the control circuit, in a second sequence of the plurality of switch states for a duty cycle less than 50%.

14. The method of claim 11, further comprising:
charging the capacitor during operation in a first subset of the plurality of switch states; and
discharging the capacitor during operation in a second subset of the plurality of switch states.

15. The method of claim 11 further comprising:
comparing a target voltage to an output voltage;
generating an initial threshold value based on the comparing; and
generating the first, second, third and fourth current thresholds based on the initial threshold value.

16. A system comprising:
a switching circuit having a first plurality of switches coupled between a switch node and an input voltage supply, a second plurality of switches coupled between the switch node and a ground node, and a capacitor coupled between the first and second pluralities of switches;
an inductor coupled between the switch node and a regulated supply voltage node; and
a control circuit, wherein the control circuit includes:
comparison circuitry configured to compare an output current from the switching circuit to ones of a plurality of threshold values; and
a state machine configured to determine a next switch state of a plurality of switch states based on duty cycle information and results of comparisons of the output current by the comparison circuitry, and further configured to change to a next switch state based on the results of the comparison by activating at least one of the first and second pluralities of switches and de-activating another one of the first and second pluralities of switches;
wherein the state machine is configured to, when operating in the first one of the plurality of switch states:
in response to receiving an indication that a voltage across the capacitor is less than a threshold voltage and that the output current exceeds a first one of the plurality of threshold values, cause a transition to a second one of the plurality of switch states; and
in response to receiving an indication that the voltage across the capacitor is greater than the threshold voltage and that the output current exceeds the first one of the plurality of threshold values, cause a transition to a third one of the plurality of switch states.

17. The system of claim 16, wherein the state machine is further configured to, when operating in the second one of the plurality of switch states:
cause a transition back to the first one of the plurality of switch states in response to receiving an indication that the output current is less than a second one of the plurality of threshold values; and
cause a transition to a fourth one of the plurality of switch states in response to receiving an indication that the output current is greater than a third one of the plurality of threshold values.

18. The system of claim 17, wherein the state machine is further configured to, when operating in the fourth one of the plurality of switch states:
cause a transition back to the second one of the plurality of switch states in response to receiving an indication that the output current is less than the second one of the plurality of threshold values and the voltage across the capacitor is less than the threshold voltage; and
cause a transition to the third one of the plurality of switch states in response to determining that the output current is less than the second one of the plurality of threshold values and the voltage across the capacitor is greater than the threshold voltage.

19. The system of claim 16, wherein the control circuit is configured to:
cause charging of the capacitor in a first subset of the plurality of switch states; and
cause discharging of the capacitor in a second subset of the plurality of switch states.

20. The system of claim 16, further comprising a threshold generation circuit configured to generate the plurality of threshold values based on an initial threshold generated by comparing a target voltage to a current output voltage.

* * * * *